Nov. 3, 1953   P. M. SMITH   2,657,777
VACUUM BRAKE APPARATUS
Filed June 6, 1951   2 Sheets-Sheet 1
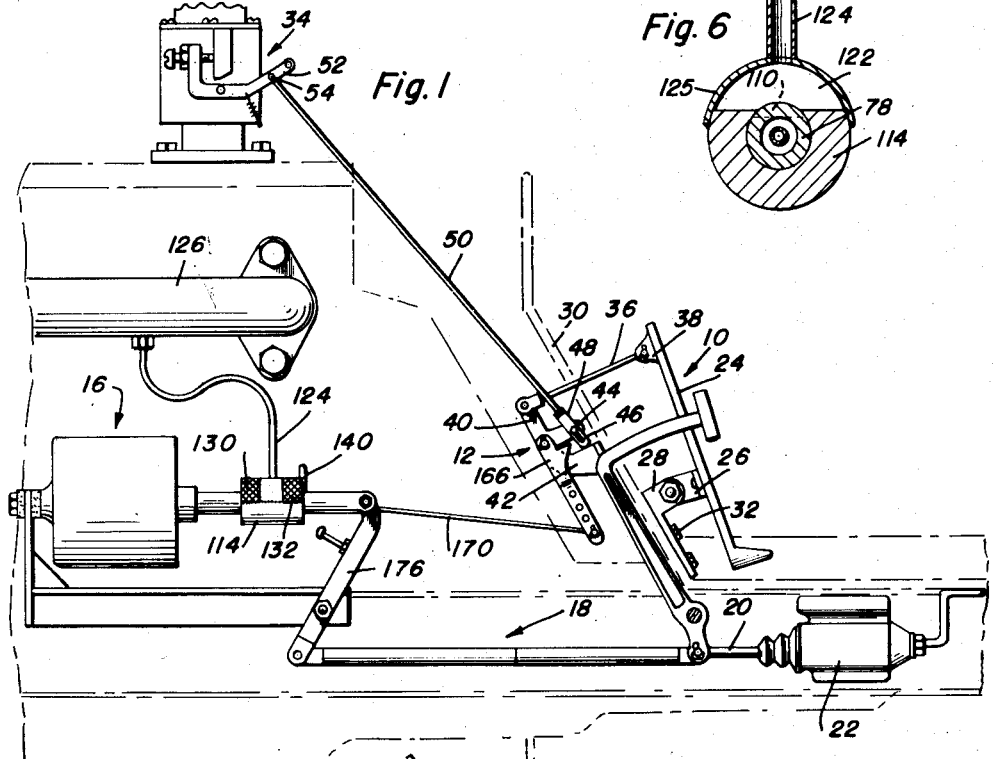
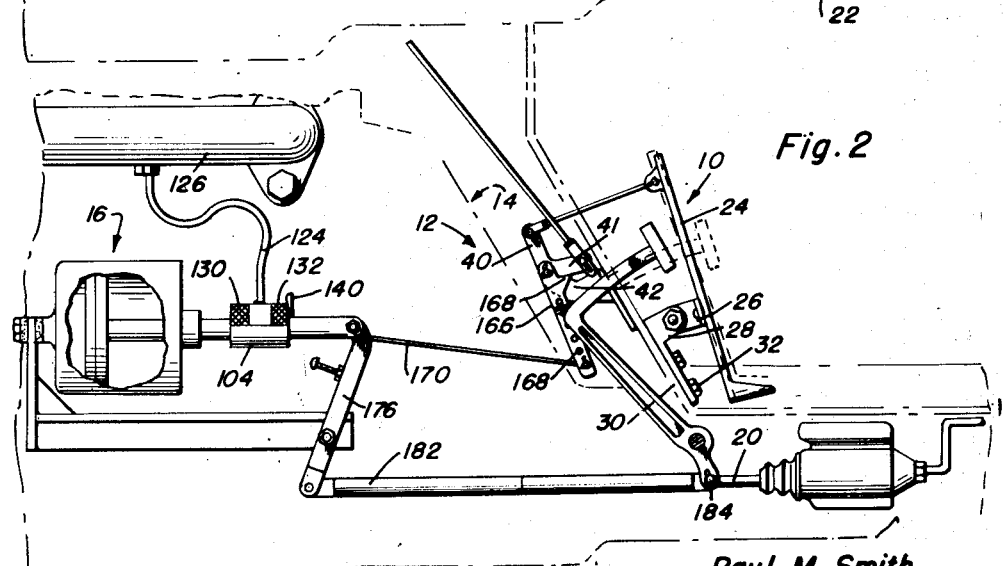
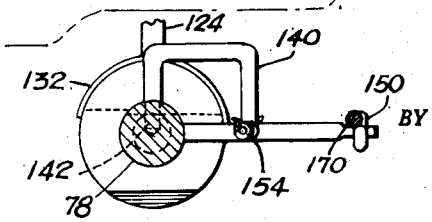
Paul M. Smith
INVENTOR.

Nov. 3, 1953 P. M. SMITH 2,657,777
VACUUM BRAKE APPARATUS
Filed June 6, 1951 2 Sheets-Sheet 2
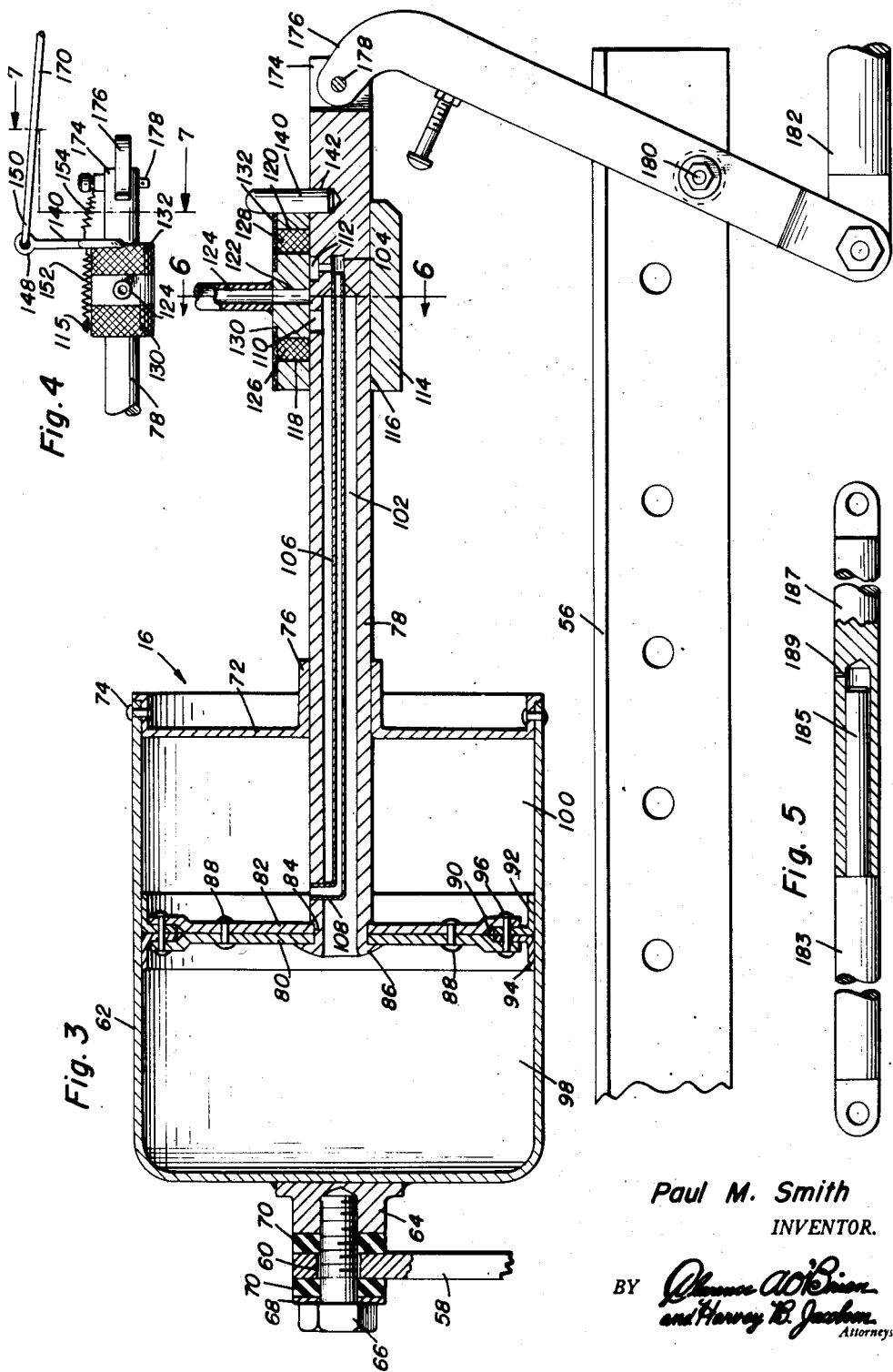
Paul M. Smith
INVENTOR.

Patented Nov. 3, 1953

2,657,777

UNITED STATES PATENT OFFICE 2,657,777

VACUUM BRAKE APPARATUS

Paul M. Smith, Cambridge, Ohio

Application June 6, 1951, Serial No. 230,145

7 Claims. (Cl. 192—3)

The present invention relates to improvements in brake apparatuses and more particularly to a brake apparatus which is adapted to be employed in combination with conventional brake means employed on automotive vehicles.

An object of the present invention is to provide a brake apparatus which can be employed as an accessory to the conventional brake apparatus of a vehicle and in combination with the conventional brake pedal of the vehicle for simultaneous operation therewith. A further object of the present invention is to provide a brake apparatus which employs the accelerator pedal of the motor vehicle for the actuating means whereby acceleration and deceleration of the vehicle can be accomplished by pivoting movement of the one pedal notwithstanding the presence of the brake pedal.

Still another object of the present invention resides in the provision of novel means in association with a vacuum cylinder and piston arrangement whereby the piston is controlled by actuation of the valve means in response to pivoting of the accelerator pedal, actuation of the vacuum piston effecting movement of the plunger of the conventional master cylinder of the vehicle.

Another object of the present invention resides in the provision of the conduit interconnecting the vacuum manifold of the automotive vehicle with the valve means whereby actuation of the valve means selectively effects longitudinal movement of the piston relative to the vacuum cylinder whereby reciprocation of the plunger of the master cylinder can be effected.

A further object of the present invention resides in the provision of lever and linkage means interconnecting the accelerator pedal with both the butterfly valve of the carburetor and the valve means controlling the vacuum cylinder whereby operation of the two can be effected for controlling the motion of the automotive vehicle.

Various other objects and advantages will become apparent from the detailed description to follow. The best form in which I have contemplated applying my invention is clearly illustrated in the accompanying drawings, wherein:

Figure 1 is a side elevational view of the brake apparatus of the present invention shown mounted on a conventional automotive vehicle, the vehicle being shown in dotted lines;

Figure 2 is a view similar to Figure 1 but wherein the accelerator pedal has been pivoted to the brake actuating position;

Figure 3 is a view showing the vacuum cylinder and piston and valve means in section with parts of the apparatus broken away;

Figure 4 is a top plan view of the valve means of the present invention;

Figure 5 is a detail view showing the telescoping plunger which interconnects the plunger of the conventional master cylinder with a lever actuated by the piston of the vacuum cylinder;

Figure 6 is a vertical transverse sectional view taken substantially along the plane of line 6—6 of Figure 3; and, Figure 7 is a vertical transverse sectional view taken substantially along the plane of line 7—7 of Figure 4.

Referring more particularly to the drawings, wherein like numerals designate like parts throughout, the numeral 10 designates generally the pedal actuating means, the numeral 12 designates generally the linkage and lever means, the numeral 14 indicates generally the valve means of the present invention, the numeral 16 designates generally the vacuum cylinder and piston assembly, while the numeral 18 designates generally the means interconnecting the piston of the vacuum cylinder with the plunger 20 of the conventional master cylinder 22 of the automotive vehicle.

In the present invention, the conventional accelerator pedal is replaced by an elongated accelerator pedal 24 which has a bracket 26 secured to its back side and pivotally supported on the bearing bracket 28, the bracket 28 being fixedly secured to the floorboard 30 by means of the bolts 32.

Part of the linkage and lever means 12 interconnects the accelerator pedal 24 with the carburetor 34. That part of the linkage and lever means includes a link 36 which is pivotally carried by the upper end 38 of the pedal 24, the opposing end of the link 36 being pivotally connected to the first and angulated lever 40. The lever 40 is pivotally supported by the bracket 42 secured to the underside of the floorboard 30. The other end of the angulated lever 40 has a pin 44 extending therethrough and slidably received in the elongated slots 46 of the connector 48. A connecting rod 50 interconnects the lever 52 of the butterfly valve of the carburetor 34 with the connector 48. Thus, it will be seen that when the accelerator pedal 24 is depressed, the angulated first lever 40 will pivot effecting opening and closing of the butterfly valve of the carburetor 34 in response to pivoting of the lever 52. The lever 52 is substantially of conventional form, the only difference being that the lever is provided with a second opening 54 to which the connecting rod 50 can be secured for varying the responsive movement of the butterfly valve relative to pivoting of the accelerator pedal 24.

Looking now at Figure 3, the vacuum cylinder and piston combination 16 will be more particularly described. An attaching bracket 56 is secured to the frame or other desirable portion of the automotive vehicle. One end of the bracket 56 has an upstanding leg 58 formed with an opening 60 therethrough. The vacuum cylinder 62 has a bar 64 at one end into which is threadably engaged a bolt 66. Metal and rubber washers 68 and 70 are disposed on opposing sides of the arm 58 and the bolt 66 is extended therethrough for engagement in the bar 64 for supporting the vacuum cylinder 62 in predetermined relation to the accelerator pedal 24.

The vacuum cylinder 62 is provided with a closure plate 72 which is secured to the periphery of the vacuum cylinder 62 by means of the rivets 74. The central portion of the closure plate 72 is formed with a protruded elongation 76 which is adapted to slidably receive the piston rod 78.

The piston rod 78 is of elongated form and has a pair of disks 80 and 82 carried by the recess 84 at one end. The piston rod 78 has that one end peened over, as at 86, for retaining the disks 80 and 82 thereon. The disks 80 and 82 are riveted together as at 88, the periphery of the disks providing a recess 90 into which a pair of leather or like elements 92 and 94 are received and fixed by rivets 96.

The leather elements 92 and 94 slidably engage the inner surface of the vacuum cylinder 62 thereby dividing the cylinder 62 into a pair of chambers 98 and 100.

The piston rod 78 is formed with an elongated bore 102 and a reduced diameter bore 104 coaxial with the bore 102. The conduit 106 is disposed within the bore 102 and has one of its ends engaged in the bore 104. The opposing end of the conduit 106 is angulated at 108 and extends through the wall of the piston rod 78 at one side of the pistons 80 and 82.

The piston rod 78 is formed with a pair of openings 110 and 112 respectively in communication with the bores 102 and 104. The opening 112 is also in open communication with the passage within the conduit 106.

The valve means 14 includes a cylindrical casing 114 having an axial bore 116 slidably receiving the piston rod 78 therethrough. The casing 114 is formed with a pair of transverse open-sided slots 118 and 120, and an intermediate slot 122. The slot 122 is communicated with the flexible conduit 124 which has its one end provided with a flange 125 overlying the slot 122 and its other end in open communication with the vacuum manifold 126 of the automotive vehicle, as best seen in Figures 1, 2 and 5.

The slots 118 and 120 have filter material 126 and 128 positioned therein and retained by the screens 130 and 132. The slots 118 and 120 are in open communication with the atmosphere through the filter means, as best seen in Figures 3 and 4.

The piston rod 78 has a retainer 140 secured within the recess 142 of the rod. The outer end of the retainer 140 has an eyelet at 146 to which the end 150 of the connecting rod 170 is attached. One spring 152 has one end connected to the retainer 140 and has its opposing end secured to the casing 114 at 115 whereby the valve means 14 will be normally urged to a first inactive position. A second spring 154 interconnects the retainer 140 with the pivot pin 178 carried at the end of the rod 78 in the bifurcated portion 174.

A portion of the linkage and lever means 12 interconnects the accelerator pedal 24 with the retainer 140, as will be presently described. A second lever 166 is pivotally carried by the bracket 42 about the same pivotal axis of the first lever 40. The second lever 166 has a projection at 168 which is adapted to engage the leg 41 of the first lever 40 for actuation thereby. The first lever 166 is also provided with a plurality of openings 168 whereby the connecting rod or link 170 can be adjustably secured to the first lever at one end and pivotally connected to the retainer 140 at its other end 148.

The bifurcated free end of the piston rod 78 has a lever 176 pivotally supported by the pin 178. An intermediate portion of the lever 176 is pivotally carried by the bracket 56, as at 180, while the free end of the lever 176 is pivotally connected to one end of the telescoping plunger 182. The other end section of the telescoping plunger 182 is connected to the plunger 20 of the conventional master cylinder 22 at 184. As best seen in Figure 5, the first section 183 of the plunger 182 has a reduced diameter extension 185 which is slidably received within the recess of the second section 187, a port 189 affording communication between the bore of the second section 187 and the atmosphere.

It will thus be seen that the sectional plunger 182 can be moved in a first direction for building up pressure in the master brake cylinder while there will be a loose connection if the section 183 is moved in an opposite direction. Of course, conventional braking can be accomplished by the use of the brake pedal.

In view of the foregoing, it is believed that a device has been provided which will accomplish all of the objects hereinabove set forth. It is believed that the operation of the present invention will be readily understood by one skilled in the art. When the brake pedal 24 is depressed by the heel in the manner shown in Figure 2, the linkage and lever means will assume the relation shown in that figure and the valve means 14 will be moved in opposition to the spring 152 whereby communication will be had between the conduit 124 and the opening 110 thereby creating a vacuum in the chamber 98 of the vacuum cylinder 62. The piston and plunger will thereby move to the left, thereby effecting pivoting of the lever 176 so that the plunger 182 moves to the right depressing the plunger 20 of the master brake cylinder 22 thereby applying the brake.

Of course, upon pivoting of the accelerator pedal 24 in the opposite direction, the connecting rod 50 will effect pivoting of the lever 52 thereby opening the throttle and effecting acceleration.

Having described the invention, what is claimed as new is:

1. A vacuum brake apparatus comprising an elongated accelerator pedal pivotally supported at an intermediate point thereon by the floorboard of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages, said pair of passages affording communication between opposing sides of said piston and a pair of longitudinally spaced openings through the surface of said piston rod, said valve means being movable over said spaced openings to selectively provide communication between the intake manifold and opposing sides of said piston, the side opposite to the one in communication with the intake manifold being in open communication with the atmosphere, linkage means connecting said pedal with said valve means for effecting operation of said valve means in response to pivoting movement of said pedal, and means interconnecting said piston rod and the conventional master brake cylinder for actuating the same upon movement of said piston.

2. A vacuum brake apparatus comprising an elongated accelerator pedal pivotally supported at an intermediate point thereon by the floor board of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages, said pair of passages affording communication between opposing sides of said piston and a pair of longitudinally spaced openings through the surface of said piston rod, said valve means being movable over said spaced openings to selectively provide communication between the intake manifold and opposing sides of said piston, the side opposite to the one in communication with the intake manifold being in open communication with the atmosphere, linkage means connecting said pedal with said valve means for effecting operation of said valve means in response to pivoting movement of said pedal, means interconnecting said piston rod and the conventional master brake cylinder for actuating the same upon movement of said piston, said last recited means including a lever having an intermediate portion thereof pivotally supported by said bracket, one end of said lever being pivotally connected to the free end of said piston rod, a plunger comprised of a pair of telescoping sections interconnecting the opposing free end of said lever with the plunger of the conventional master cylinder.

3. A vacuum brake apparatus comprising an elongated accelerator pedal pivotally supported at an intermediate point thereon by the floorboard of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages, said pair of passages affording communication between opposing sides of said piston and a pair of longitudinally spaced openings through the surface of said piston rod, said valve means being movable over said spaced openings to selectively provide communication between the intake manifold and opposing sides of said piston, the side opposite to the one in communication with the intake manifold being in open communication with the atmosphere, linkage means connecting said pedal with said valve means for effecting operation of said valve means in response to pivoting movement of said pedal, means interconnecting said piston rod and the conventional master brake cylinder for actuating the same upon movement of said piston, said linkage means including a first angulated lever pivotally carried below the floorboard and having one end connected for movement with said pedal and the other end adapted to be connected with the butterfly valve of a carburetor for actuating the same, a second lever pivotal about the pivotal axis of said first lever and having a projection engageable with one leg of said first lever whereby pivoting of said first lever in one direction can effect pivoting movement of said second lever, a retainer on said piston rod, said valve means being resiliently connected to said retainer for normally maintaining the valve means in a first position, and a connecting rod having its ends connected to said second lever and said retainer.

4. A vacuum brake apparatus comprising an elongated accelerator pedal pivotally supported at an intermediate point thereon by the floorboard of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages, said pair of passages affording communication between opposing sides of said piston and a pair of longitudinally spaced openings through the surface of said piston rod, said valve means being movable over said spaced openings to selectively provide communication between the intake manifold and opposing sides of said piston, the side opposite to the one in communication with the intake manifold being in open communication with the atmosphere, linkage means connecting said pedal with said valve means for effecting operation of said valve means in response to pivoting movement of said pedal, means interconnecting said piston rod and the conventional master brake cylinder for actuating the same upon movement of said piston, said valve means including a cylindrical casing having an axial bore for slidably positioning said casing on said piston rod, said casing having a pair of transverse slots selectively in communication with said spaced openings, said casing having an intermediate slot in communication with said conduit, and the pair of slots being in open communication with the atmosphere.

5. A vacuum brake apparatus comprising an elongated accelerator pedal pivotally supported at an intermediate point thereon by the floorboard of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages, said pair of passages affording communication between opposing sides of said piston and a pair of longitudinally spaced openings through the surface of said piston rod, said valve means being movable over said spaced openings to selectively provide communication between the intake manifold and opposing sides of said piston, the side opposed to the one in communication with the intake manifold being in open communication with the atmosphere, linkage means connecting said pedal with said valve means for effecting operation of said valve means in response to pivoting movement of said pedal, means interconnecting said piston rod and the conventional master brake cylinder for actuating the same upon movement of said piston, said valve means including a cylindrical casing having an axial bore for slidably positioning said casing on said piston rod, said casing having a pair of transverse slots selectively in communication with said spaced openings, said casing having a radial bore in communication with said conduit, the pair of slots being in open communication with the atmosphere, a retainer secured to said piston rod, and resilient means interconnecting said valve means and said retainer for urging said valve means to a first deactuated position.

6. In a vehicle including a master brake cylinder having an operating rod, a manifold, a brake operator comprising a pedal, a swingable lever connected at one end to the operating rod and at its other end to the pedal, a slide valve housing having an opening communicating with the manifold, a cylinder, a piston slidable in the cylinder, said piston having a piston rod extending from said cylinder, said valve housing slidably carried by and terminally secured to said piston rod and the said other end of said lever, said cylinder comprising two chambers and said valve housing including two passages, one of said passages communicating with one chamber, and the other passage communicating with the other chamber, said passages each having an inlet selectively registerable with said opening.

7. In a vehicle including a carburetor having a butterfly valve, a manifold and a master brake cylinder having an operating rod, a brake and throttle operator comprising an elongated accelerator pedal pivotally supported at an intermediate point thereon by the floorboard of an automotive vehicle, a vacuum cylinder supported by a bracket adjacent the intake manifold of the vehicle, a piston and piston rod slidable in said cylinder, valve means slidably carried on said piston rod, a conduit interconnecting said valve means with the intake manifold, said piston rod being hollow and provided with a pair of concentric passages and a pair of longitudinally spaced openings in the surface thereof, said pair of passages affording communication between opposing sides of said piston and said pair of longitudinally spaced openings through the surface of said piston rod, said valve means being movable over said spaced openings to selectively provide communication between the intake manifold and opposing sides of said piston, the side opposite to the one in communication with the intake manifold being in open communication with the atmosphere, linkage means connecting said pedal with said valve means and the butterfly valve of the carburetor of the automotive vehicle for effecting operation of said valve means and the carburetor in response to pivoting movement of said pedal, means interconnecting said piston rod and the conventional master brake cylinder for actuating the same upon movement of said piston, said linkage means including a first angulated lever pivotally carried below the floorboard and having one end operatively connected for movement with said pedal and the other end operatively connected with said butterfly valve for actuating the same, a second lever pivotal about the pivotal axis of said first lever and having a projection engageable with one leg of said first lever whereby pivoting of said first lever in one direction can effect pivoting movement of said second lever, a retainer on said piston rod, said valve means being resiliently connected to said retainer, for normally maintaining the valve in a first position, and a connecting rod having its ends connected to said second lever and said retainer.

PAUL M. SMITH.

References Cited in the file of this patent

UNITED STATES PATENTS

| Number | Name | Date |
|---|---|---|
| 1,548,232 | Westbrook | Aug. 4, 1925 |
| 1,565,767 | Westbrook | Dec. 15, 1925 |
| 1,630,809 | Simpson | May 31, 1927 |
| 1,887,428 | Powell | Nov. 8, 1932 |
| 1,962,649 | Powell | June 12, 1934 |
| 2,063,793 | Cook | Dec. 8, 1936 |
| 2,087,305 | Schmitt | July 20, 1937 |
| 2,124,900 | Winters | July 26, 1938 |
| 2,135,071 | Folberth | Nov. 1, 1938 |

FOREIGN PATENTS

| Number | Country | Date |
|---|---|---|
| 487,909 | Great Britain | June 28, 1938 |